April 6, 1937.  H. A. KAUFMANN  2,075,811
VALVE
Filed Feb. 15, 1934  2 Sheets-Sheet 1
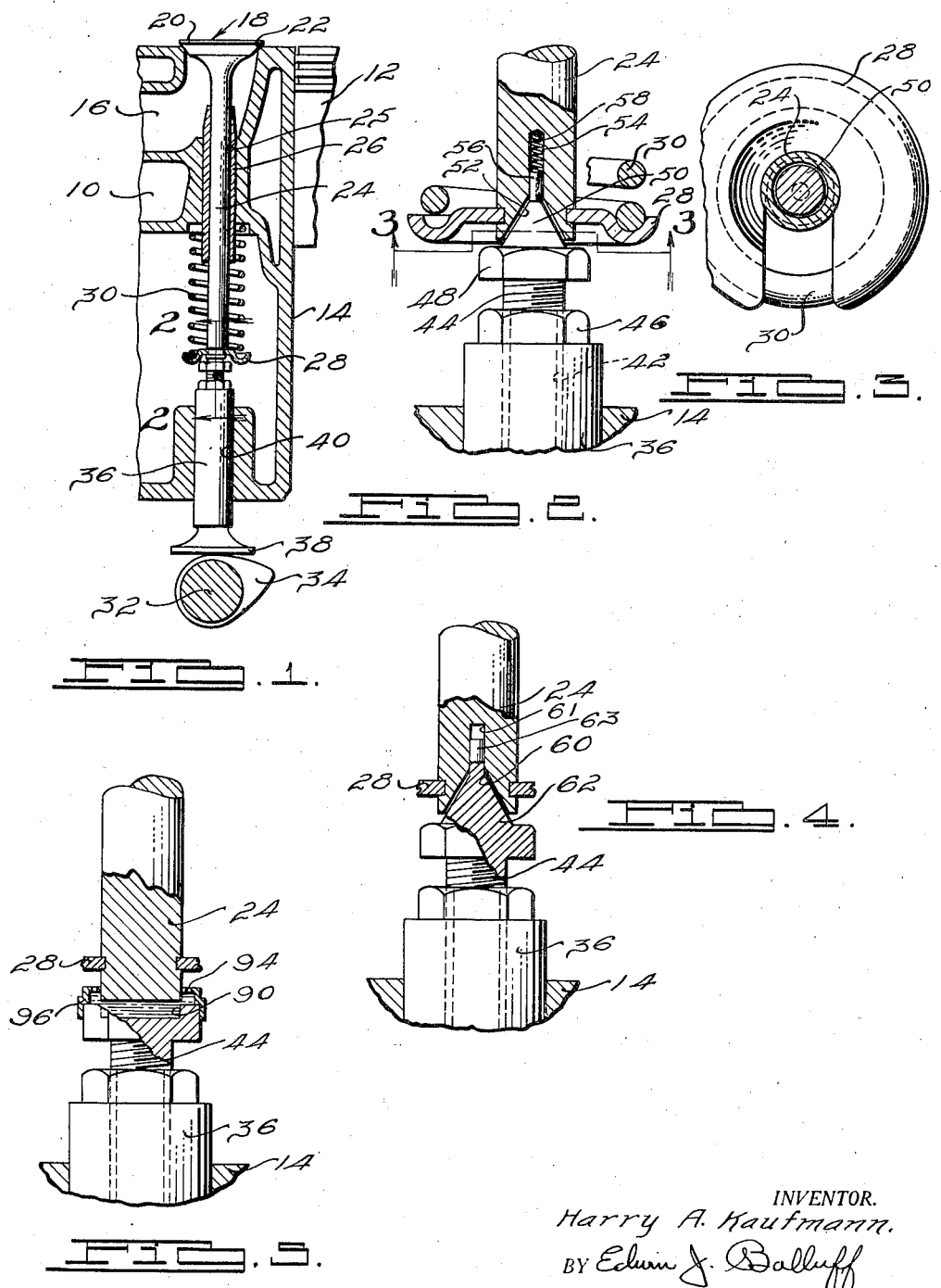
INVENTOR.
Harry A. Kaufmann.
BY Edwin J. Balluff
ATTORNEY.

April 6, 1937. H. A. KAUFMANN 2,075,811
VALVE
Filed Feb. 15, 1934 2 Sheets-Sheet 2

INVENTOR.
Harry A. Kaufmann.
BY Edwin J. Balluff
ATTORNEY.

Patented Apr. 6, 1937

2,075,811

UNITED STATES PATENT OFFICE 2,075,811

VALVE

Harry A. Kaufmann, Detroit, Mich.

Application February 15, 1934, Serial No. 711,417

8 Claims. (Cl. 123—90)

This invention relates to improvements in valve construction, particularly to that type having a valve element or head actuated by a reciprocating stem, such as commonly are used in internal combustion engines and designated as poppet valves.

Such valves in internal combustion engines perform the function of controlling the flow of gases to and from the combustion cylinder, and for that purpose the movement of such valves is co-related with that of a reciprocating piston in the combustion cylinder to close and open the same to the flow of gases at certain predetermined intervals of time. Improper co-relation or adjustment of the valves causes losses of compression and power and result in sluggish engine performance. With internal combustion engines having crankshaft speeds of several thousand revolutions per minute, it will be appreciated that the intervals between openings of a valve, as well as the duration of the period such a valve is open, must be extremely small.

In internal combustion engines such as are used in automotive vehicles, it is essential, in addition to proper adjustment of the valves, to have a valve, which in operation will not be noisy to the annoyance of the occupants of such vehicles. Valves, such as are used in internal combustion engines in automotive vehicles, comprise generally a circular head cooperable with a circular seat formed around a port leading to or from a combustion cylinder, a stem secured to said head for moving the same, a relatively stiff spring normally biasing said head into sealing contact with its seat, a push rod actuated by a cam and adapted to engage the end of said valve stem for lifting said head off its seat and an adjusting bolt usually carried by the push rod, directly engageable with the end of the valve stem and adjustable for providing a clearance between the valve stem and push rod to allow for expansion resulting from temperature changes.

Failure to provide sufficient clearance will result in a riding valve; that is, a valve, the head of which is held off its seat when the engine is hot, with attendant loss in compression, etc.; while excessive clearance will allow the valve heads to remain on their seats too long, etc., as well as produce undesirable and excessive engine noise.

In the assembly and installation of internal combustion engines in automotive vehicles under modern production methods, the usual inaccessibility of the adjusting bolt for the valves, the permissible time element for each valve adjusting operation and the inaccuracies of the threads of the adjusting bolt render it extremely difficult, when the engine is operating, expeditiously and satisfactorily to adjust the valves, particularly for the substantial elimination of valve tappet noise, which requires an adjustment allowing approximately only two-thousandths of an inch clearance between the valve stem and push-rod, although clearances up to twelve-thousandths are permissible from the standpoint of operating efficiency.

For the purpose of substantially eliminating valve tappet noise, there is disclosed herein a novel and highly practical construction wherein means are provided between the valve and the actuating cam and associated with the adjusting bolt which effectively reduces and practically eliminates the hammering noise resulting from the provision of clearances between the valve and the actuating means therefor.

To that end there is illustrated a plurality of different embodiments of means for practicing the invention, which, in general, provide a means associated with the adjusting bolt for dissipating and/or eliminating valve tappet noises. As exemplified in some of the embodiments herein illustrated, said means comprise the provision of relatively large areas of surface contact between parts, between which clearance has been provided, for substantially eliminating the noises resulting from successive contacting, without increasing the cross sectional area of the respective parts. In other embodiments, the end of a stem, such as the valve stem, has been utilized for reciprocating in a cylinder, substantially filled with a liquid, such as oil, to be moved by the liquid as a result of the incompressibility thereof. In some instances it may be desirable to utilize a pneumatic device in which the resistance to the flow of air offered by a restricted outlet, may be utilized.

One object of the invention, therefore, is to provide a valve construction with means for eliminating tappet noise resulting from operation thereof.

Another object of the invention is to provide a device for eliminating valve tappet noise and which can readily and inexpensively be installed in engines now in use.

Another object of the invention is the provision of a valve tappet noise silencing device which is simple in construction, durable, and inexpensive to produce and install in new engines or those now in use and which may easily be adjusted on account of the elimination of the necessity for relatively small clearances.

Other objects and advantages will be apparent from the following specification with reference to the accompanying drawings of which there are two sheets and in which:

Fig. 1 is a view, partly in section, of an internal combustion engine and illustrating the application of one form of the invention thereto;

Fig. 2 is an enlarged side elevational view, partly in section and taken generally in a plane corresponding to the lines 2—2 of Fig. 1 and illustrating the details of a preferred form of the invention;

Fig. 3 is a view taken in a plane on the lines 3—3 of Fig. 2 and looking in the direction of the arrows;

Fig. 4 is a side elevational view of part of a valve mechanism and illustrating a modified form of the invention;

Figs. 5, 6 and 13 are similar views of modified forms of the invention utilizing a non-compressible liquid column for quietly taking up the slack between parts of a valve mechanism;

Figure 6:
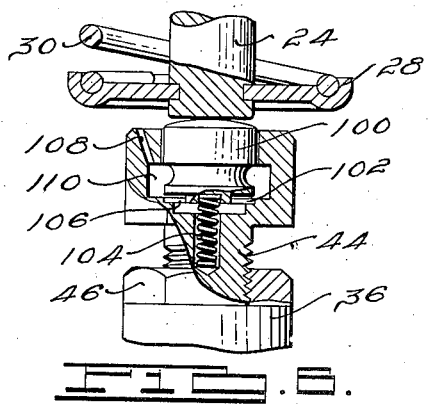

Referring now to Fig. 1 of the drawings, there is illustrated at 10 a portion of an engine block of an internal combustion engine, such as are used in automotive vehicles, having a piston 12, reciprocable in a bore 14 which, above the piston and below a cylinder head (not shown), is adapted to provide a combustion chamber to which ports such as 16 lead for the supply and exhaust of gases and other products of combustion. The flow of gases to and from the combustion chamber and through the ports may be controlled by poppet valves such as 18 which, in general, comprise a circular head 20, the peripheral under edge of which is smoothly finished to provide a valve element for engagement with a seat 22 formed about the port 16 and a stem 24 operable for actuating the valve head.

The valve stem 24 extends through a guide sleeve 26 fitted within a bore 25 provided in the cylinder block 10 and has affixed to the end thereof a collar 28, between which and that portion of the cylinder block 10 around the bore 25, a relatively stiff spring 30 is confined for biasing the valve head 20 into sealing engagement with its seat 22.

A cam shaft 32, driven in timed relationship with the crankshaft (not shown) to which the piston 12 is connected by a connecting rod (also not shown), is provided with a cam 34 for lifting the valve head 20 off its seat at timed intervals. For the purpose of communicating the displacing movement of the cam 34 resulting from rotation of the shaft 32, a push-rod 36 having a head 38 following the cam 34 is reciprocably mounted in a bore 40 provided in a lower portion of the cylinder block 10 and directly below the bore 25. At the upper end thereof, push-rod 36 is provided with an internally threaded bore 42 in which a stud or adjusting bolt 44 is threadedly secured and locked therein by a lock nut 46.

In known constructions, the head 48 of the adjusting bolt 44 is adapted to engage the end of the valve stem 24 for lifting the valve head 20 off of its seat 22 and to allow for expansion, the adjusting bolt 44 is vertically adjusted and locked in position to provide a clearance between the head 48 and the end of the valve stem. Thus, upon every cycle of cam 34, it is necessary for the head 48 of the bolt 44 to make a contact with the end of the valve stem 24. If excessive clearance between the parts has been provided, the noise becomes excessive and objectionable. In practice, on account of the inaccuracies of the threads of the bore 42 and bolt 44, it is extremely difficult to effect a "noiseless" valve adjustment without causing a "riding" valve; that is, a valve which never is allowed to seat.

As clearly illustrated in the preferred embodiment disclosed by Fig. 2, I have provided a means between the push-rod 36 and the valve stem 24 for eliminating the valve tappet noise, which in this instance comprises a plunger 50, of frusto-conical shape, fitting within a complementary-shaped counterbore 52 provided in the end of valve stem 24. The counterbore is provided at its innermost end with a cylindrical bore 54, in which a cylindrical shank 56 provided on the reduced end of the plunger 50 is adapted to reciprocate, for the purpose of guiding the plunger 50 in its reciprocating movement and for aligning the complementary contacting surfaces of bore 54 and shank 56. A spring 58 may, if desired, be confined between the closed end of cylindrical bore 54 and the end of shank 56 for biasing plunger 50 to follow the head 48 of the adjusting bolt 44, although the spring may be omitted, as gravity alone would force the plunger 50 to tend to follow the adjusting bolt head 48.

Since the plunger 50 will, in any event, follow the head 48 of bolt 44, it will be apparent that the clearance provided between the head of the bolt 44 and the end of the valve stem 24 will occur between the frusto-conical surface of the plunger 50 and the complementary surface of the counterbore 52, which surfaces are in practice covered with a film of oil. The relatively large area of the contacting surfaces, that is, the adjacent surfaces of those parts which are moved into and out of engagement during operation of the valve, which in the present instance are relatively large as compared with the contacting surfaces of known constructions, considered together with the fact that the dimensions of the parts of the valve construction have not been increased, eliminates the usual valve tappet noise, by distributing the force with which the parts come together over a large area of surface covered with a film of oil.

Since the plunger 50 is self-aligning with the bore 52, the coming together of the parts will produce substantially no noise, even though the clearance between the parts may be what otherwise would be considered as excessive and certain to result in objectionable noise in known constructions. On account of the usual inaccuracies of the thread of the bore 42 and bolt 44, the head 48 often becomes canted, with the result that the area of contact between the head 48 and the end of the valve stem is nothing more than a point and, in devices heretofore known, a cause of excessive noise, particularly if the clearance provided was more than a certain minimum, which is extremely difficult to gauge under the conditions heretofore enumerated. The constructions herein disclosed permit a relatively wide permissible variation in adjusting the valves, which at the same time achieves the desired quietness of operation and results in the saving of time.

The spring 58, if used, should be relatively light with respect to that of spring 30 to avoid synchronization of the two, which seriously would affect the operation of the valve.

It will be appreciated that this device may readily be added to engines now in use without necessitating an expensive installation job or requiring the discarding of present equipment or parts, which readily may be machined to accommodate a plunger such as 50. The shank 56 should be of sufficient length such as an amount slightly greater than the rise of cam 34, to prevent the accidental displacement of the plunger 50.

It, of course, will be appreciated that the plunger may be made in various forms, such, for example, as I have chosen to illustrate in Figs. 4, 7, 8 and 9. In Fig. 4, the valve stem 24 has been provided with a conical-shaped counterbore 60, terminating in a cylindrical counterbore 61, which is adapted to receive a conical-shaped head 62 formed on the upper extremity of the adjusting bolt 44, and a cylindrical shank 63. In operation, this construction functions exactly like that of Fig. 2.

Figure 7:
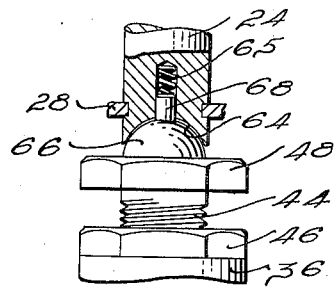

Fig. 7 illustrates a modification in which the end of the valve stem is provided with an arcuately recessed surface 64 and a cylindrical bore 65 for receiving a complementary arcuately-shaped plunger 66, between which and the arcuately recessed surface 64 a relatively large area of contacting surface is provided, and a shank 68 for aligning the plunger 66 and the recessed surface 64.

Figure 8:
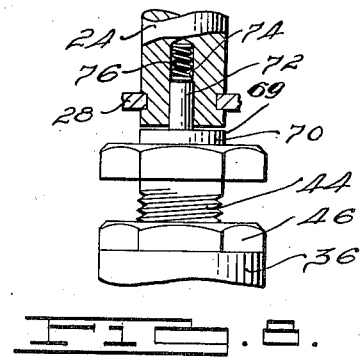
Figs. 7, 8, 9 and 10 are similar views illustrating other forms of the invention and the application thereof to various types of valve actuating mechanisms.

In Fig. 8, a plunger 69, comprising a circular head 70 and a cylindrical shank 72, is illustrated, which is adapted to follow the adjusting bolt 44 and the shank of which is reciprocably mounted in a cylindrical counterbore 74 provided in the end of a valve stem. A spring 76 may be used for biasing the head 70 to follow the adjusting bolt. In this instance the under-surface of head 70 about the shank 72 is adapted to contact the end portion of valve stem 24 around bore 74, which in operation would be covered by an oil film, for effectively dissipating any noise resulting from impact of these parts.

Figure 9:
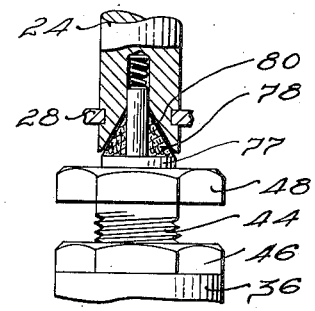

Fig. 9 illustrates a modification in which a plunger 77, similar to plunger 68, may be provided with a conical-shaped washer 78 of suitable fibrous material, which is adapted to contact the walls of a complementary-spaced bore 80. The shape of the washer 78, as well as that of the bore, would tend to retain the washer 78 in its original form.

Figure 10:
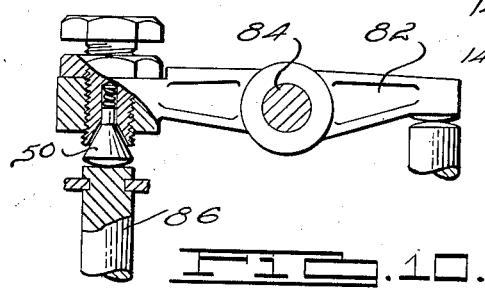

In Fig. 10, I have illustrated the application of my invention to an engine of the overhead valve type, in which a rocker 82, mounted on a shaft 84, is adapted to unseat a valve (not shown) affixed to the lower end of a stem 86, which engages one arm of the rocker 82. It will be appreciated that any of the modifications of the invention may be used, the one illustrated in Figs. 1 and 2 having been selected merely for purposes of illustration. However, it should be noted that the reciprocable plunger in this instance is carried, not by the valve stem but by the rocker.

In order to prevent the accumulation of dirt within the plunger bore, it is essential that the bore be self-cleaning, which may be accomplished by having the open end of the bore lowermost.

Referring now to Figs. 5 and 6, there are illustrated modifications of the invention wherein an incompressible fluid such as engine oil is provided in a cylinder with which a piston, connected to the relatively movable part of the valve construction, cooperates. As illustrated in the detail view of Fig. 5, the adjusting bolt 44 may be provided with a cylindrical bore 90 in the head thereof, which is disposed in alignment with the end of the valve stem 24, which may be considered as a piston and which is adapted to be filled with and kept full of oil. Since the oil is incompressible, it will be apparent that so soon as the piston-like end of the valve stem seals the cylinder, the valve will be lifted off its seat by the further vertical movement of the push-rod 36 to which the adjusting bolt 44 is affixed. Thus, the valve will be actuated and the clearance between the parts taken up without effecting a mechanical contact, which eliminates the usual valve tappet noises.

A guide sleeve 96, provided with an aperture through which the valve stem 24 projects, may be affixed to the head of the adjusting bolt 44 for maintaining the stem 24 and bore 90 in alignment and for providing an oil reservoir for the cylindrical bore 90, and may be provided with openings 94 to allow the escape of excess fluid.

In the modification illustrated in Fig. 6, the reservoir, as well as the cylindrical bore, is provided within the head of the adjusting bolt 44, and a plunger 100, cooperable with a cylindrical bore 102 for taking up the slack between the parts of the device and transmitting the movement of the push-rod 36 to valve stem, is provided. The plunger 100 may be a plug of any shape to correspond with that of the bore 102, which is filled with oil. A spring 104 may be confined between the end of the bore 102 and the plunger 100 for biasing the latter into engagement with the end of valve stem 24.

The cylindrical bore 102 may be provided with a stop shoulder 106 for limiting the downward movement of the plunger 100, whereby the adjusting of a valve having such a device is considerably simplified. A port 108 may be provided in the bolt head for permitting the escape of excess fluid from the reservoir 110. In operation, this device functions exactly like that illustrated in Fig. 5.

Figure 11:
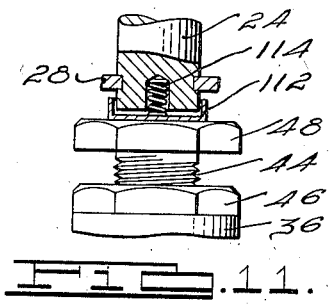
Figs. 11 and 12 are similar views of a modified form of the invention utilizing a pneumatic device for taking up the slack between the parts of a valve mechanism.
Figure 12:
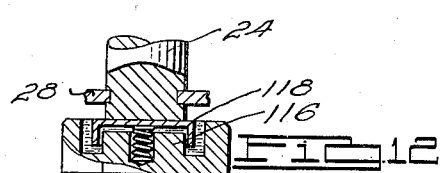

In Figs. 11 and 12 there are illustrated two modifications of the invention in which air as a working fluid is utilized in a piston and cylinder combination disposed between the relatively movable parts of the apparatus. In Fig. 11 a sleeve 112, closed at one end, is fitted over the end of a valve stem 24 and is biased into engagement with adjusting bolt 44 by a spring 114 confined between the end of the sleeve 112 and a bore in the valve stem. In Fig. 12 the head of the adjusting bolt has been cut away to provide a piston-like member 116 over which a cap 118 is reciprocably mounted and biased into engagement with the end of valve stem 24. In the type of devices illustrated in both Figs. 11 and 12, the resistance of the confined air to compression is adapted to take up the clearance between the relatively movable parts of the device, and the elimination of metal-to-metal contact will eliminate the usual noises attending the operation of such devices. Since the cutaway portions of the adjusting bolt head, as illustrated in Fig. 12, are open at the top, it is contemplated that oil will accumulate therein for effectively sealing the cap 118 against escape of air.

Figure 13:
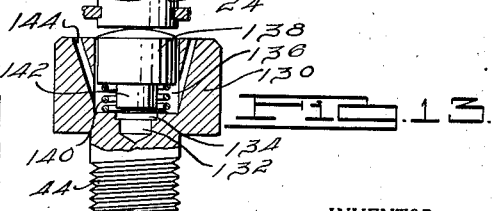

In Fig. 13 there is illustrated a modification of

Fig. 6 in which the head 130 of an adjusting bolt 44 is provided with a plurality of different diameter communicating bores 132, 134 and 136 in the larger of which a cylindrical plunger 138 is reciprocably mounted and biased into engagement with valve stem 24 by spring 140 disposed around a reduced cylindrical portion 142 provided on the under side of plunger 138 and confined between the same and the end wall of bore 136.

Cylindrical portion 142 is adapted to fit bore 134, but is prevented from reciprocating within the same because of an incompressible fluid such as oil, with which the bores are adapted to be filled, which effectively prevents movement of cylindrical portion 142 within bore 134, since no escape is provided for the oil therein. Plunger 138 fitting within bore 136 is adapted to keep cylindrical portion 142 in alignment with cylindrical bore 134. The shoulder formed between bores 132 and 134 is adapted to provide a stop for the plunger 138 during adjustment of the valves. Ports 144 may be provided to prevent any suction effect on plunger 138.

While I have illustrated and described several modifications of the invention, it must be understood that many changes may be made without departing from the spirit of the invention, and I therefore desire the illustrated embodiments to be considered in all respects as illustrative and not restrictive, reference being had to the appended claims rather than to the foregoing description, to indicate the scope of my invention.

Having thus described my invention, what I claim as new and desire to secure by Letters Patent is:

1. In a device of the class described, the combination of an adjusting bolt with a valve stem, a liquid filled bore provided in said bolt, a plunger cooperable with the wall of said bore movable into and out of engagement therewith, and means biasing said plunger into engagement with said valve stem.

2. In valve construction, a valve stem, an actuating rod therefor and spaced therefrom, spaced coaxial bores in said rod and filled with a noncompressible liquid, a piston having spaced coaxial portions for each of said bores, respectively, one of said piston portions being adapted to seal liquid in its respective bore, said other piston portion and said other bore forming guide means for said piston, and means biasing said piston into engagement with the end of said valve stem and out of sealing engagement with the lower one of said bores.

3. In combination, a valve stem, an actuating rod operable for moving said stem and movable relative thereto, a cylindrical bore in said rod open at the upper end thereof and containing a fixed volume of liquid, and a piston following said stem and adapted to cooperate with said bore for sealing and exposing the liquid therein upon reciprocation of said rod, the diameter of said piston being slightly less than the diameter of said bore.

4. In a device of the class described, the combination of an adjustable bolt with a valve stem, a bore in said bolt having a column of fluid therein, a plunger movable slightly into and out of said bore and cooperable with the walls thereof for sealing said fluid therein, guide means for said plunger, means acting on said plunger for causing the same to follow said stem, and vent means exposing said fluid column to atmosphere when said plunger is out of contact with said bore.

5. In a valve construction, the combination with two movable members, one adapted to be moved by the other and provided with a clearance between opposed portions thereof, a fluid column of fixed height carried by one of said members, a plunger means following the other of said members movable into and out of contact with said fluid column, and guide means for said plunger.

6. In valve construction, a valve stem, a push-rod for actuating said stem and spaced from the end thereof, a bore provided in the end of said push-rod and filled with liquid, plunger means following said valve stem movable into and out of engagement with said bore, and guide means for said plunger.

7. In valve construction, a valve stem, an actuating rod therefor and spaced therefrom, spaced coaxial bores in said rod and filled with a noncompressible liquid, a piston following said valve stem movable into and out of engagement with one of said bores, and guide means for said piston.

8. An adjusting screw for regulating the clearance between a valve stem and push-rod, said screw having an open bore in the head thereof filled with an incompressible column of liquid of constant height, and additional means carried by the screw to guide the valve stem into and out of engagement with said bore.

HARRY A. KAUFMANN.